United States Patent
Schultz

(10) Patent No.: US 9,939,210 B2
(45) Date of Patent: Apr. 10, 2018

(54) PIN FIN COMPLIANT HEAT SINK WITH ENHANCED FLEXIBILITY

(71) Applicant: INTERNATIONAL BUSINESS MACHINES CORPORATION, Armonk, NY (US)

(72) Inventor: Mark D. Schultz, Ossining, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 311 days.

(21) Appl. No.: 14/500,541

(22) Filed: Sep. 29, 2014

(65) Prior Publication Data

US 2016/0091260 A1 Mar. 31, 2016

(51) Int. Cl.
*F28F 3/02* (2006.01)
*B23P 15/26* (2006.01)

(52) U.S. Cl.
CPC .............. *F28F 3/022* (2013.01); *B23P 15/26* (2013.01)

(58) Field of Classification Search
CPC .. F28F 3/022; H01L 23/4338; H01L 23/3736; H05K 7/20509; H05K 7/20436; B23P 15/26
USPC ......................................................... 165/185
See application file for complete search history.

(56) References Cited

U.S. PATENT DOCUMENTS

| | | | |
|---|---|---|---|
| 4,254,431 A * | 3/1981 | Babuka | H01L 23/3733 165/185 |
| 4,381,032 A * | 4/1983 | Cutchaw | H01L 23/4338 165/185 |
| 4,442,450 A * | 4/1984 | Lipschutz | H01L 23/433 165/80.2 |
| 5,022,462 A * | 6/1991 | Flint | H01L 23/4338 165/185 |
| 5,650,914 A * | 7/1997 | DiStefano | H01L 23/3672 165/185 |
| 6,392,431 B1 * | 5/2002 | Jones | G01K 1/026 324/750.09 |
| 6,867,976 B2 * | 3/2005 | Belady | F28F 13/00 165/185 |
| 7,077,858 B2 | 7/2006 | Fletcher et al. | |
| 7,264,041 B2 | 9/2007 | Karidis et al. | |
| 7,355,855 B2 | 4/2008 | Karidis et al. | |
| 7,362,582 B2 | 4/2008 | Karidis et al. | |
| 7,399,919 B2 | 7/2008 | McCutcheon et al. | |
| 7,408,780 B2 | 8/2008 | Karidis et al. | |
| RE40,618 E | 1/2009 | Nelson et al. | |

(Continued)

OTHER PUBLICATIONS

IBM, "Chip-Cooling Apparatus With Flexible Material Separating Cooling Fluid From Chip and With Metal Plate Contacting Chip and Attached to Flexible Material by Studs Extending Into Cooling Fluid," Aug. 1985. pp. 1-3.

*Primary Examiner* — Tho V Duong
(74) *Attorney, Agent, or Firm* — Tutunjian & Bitetto, P.C.; Daniel P. Morris

(57) ABSTRACT

Heat sinks and methods of using the same include a top and bottom plate, at least one of which has a plurality of pin contacts flexibly connected to one another, where the plurality of pin contacts have vertical and lateral flexibility with respect to one another; and pin slice layers, each having multiple pin slices, arranged vertically between the top and bottom plates such that the plurality of pin slices form substantially vertical pins connecting the top and bottom plates.

20 Claims, 4 Drawing Sheets

(56) References Cited

U.S. PATENT DOCUMENTS

| | | |
|---|---|---|
| 7,545,647 B2 | 6/2009 | Karidis et al. |
| 7,545,648 B2 | 6/2009 | Karidis et al. |
| 8,030,755 B2 * | 10/2011 | Lee .................... H01L 23/4334 |
| | | 257/706 |
| 8,736,048 B2 | 5/2014 | Schultz |
| 2005/0061473 A1 | 3/2005 | Fletcher et al. |
| 2006/0191675 A1 | 8/2006 | Fletcher et al. |
| 2013/0199767 A1 * | 8/2013 | Karidis .................. H01L 24/72 |
| | | 165/185 |

* cited by examiner

PIN FIN COMPLIANT HEAT SINK WITH ENHANCED FLEXIBILITY

STATEMENT REGARDING FEDERALLY SPONSORED RESEARCH OR DEVELOPMENT

This invention was made with Government support under Contract No.: DE-EE0002894 (Department of Energy (DOE)). The Government has certain rights to this invention.

BACKGROUND

Technical Field

The present invention relates to cooling and, more particularly, to pin fin compliant heat sinks having enhanced flexibility.

Description of the Related Art

Compliant heat sinks provide a good heat removal solution with low thermal resistance and substantially lower thermal interface stresses than standard, rigid heat sinks. Compliant heatsinks are able to conform to an irregular device surface without damage to the heatsink or to the device. In particular, pin fin compliant (PFC) and linked pin fin compliant (LPFC) heat sinks have favorable compliant performance at a relatively low cost.

PFC heat sinks include an array of pins between two compliant membranes. The PFC assembly is forced into contact with a device to be cooled using a compression layer. Small, local deviations from flatness are handled by PFCs with relatively low loads, as neighboring pins can move up and down relative to one another. Global deviations (such as a curved surface) can also be handled with sufficient loading, but the load needs to be high enough to bend the PFC heat sink as a whole. This puts one of the membranes in tension, resisting the bending. In the case of LPFC heat sinks, the links between individual pins also tend to resist bending. As such, standard PFC and LPFC heat sinks use high degrees of loading force when used on curved surfaces. These high loads create a risk of damage when installing or removing the heatsink, whether to the heatsink itself or to the device to be cooled.

SUMMARY

A heat sink includes a top and bottom plate, at least one of which includes a plurality of pin contacts flexibly connected to one another. The plurality of pin contacts have vertical and lateral flexibility with respect to one another. The cooling device further includes vertical pins connecting the top and bottom plates.

A linked pin fin compliant heat sink includes a top and a bottom plate. A plurality of pin slice layers, each comprising a plurality of pin slices, is arranged vertically between the top and bottom plates such that the plurality of pin slices form substantially vertical pins connecting the top and bottom plates. There is a plurality of curved links connecting laterally adjacent pin slices in at least a pin layer.

A method for employing a heat sink includes placing a pin fin compliant heat sink on a non-flat surface. The pin fin complaint heat sink has top and bottom plates connected by a plurality of pins arranged vertically between the top and bottom plates. The top and bottom plates are vertically conformed to local deviations of the non-flat surface. The top and bottom plates are laterally conformed to an overall shape of the surface, wherein at least either the top or bottom plate is corrugated.

These and other features and advantages will become apparent from the following detailed description of illustrative embodiments thereof, which is to be read in connection with the accompanying drawings.

BRIEF DESCRIPTION OF THE SEVERAL VIEWS OF THE DRAWINGS

The disclosure will provide details in the following description of preferred embodiments with reference to the following figures wherein.

DETAILED DESCRIPTION

Embodiments of the present invention provide pin fin compliant (PFC) and linked pin fin compliant (LPFC) heat sinks with enhanced flexibility that allow the heat sinks to be used on curved surfaces with substantially lower loads than those needed by conventional heat sinks. To accomplish this, the present embodiments employ pin membranes (plates) that are corrugated between pin contacts, which greatly reduces the effective modulus of the membrane in tension or compression, allowing the plates to accommodate lateral displacements as well as vertical displacements. Lateral displacement along the top plate allows the pins to angle away from one another, such that an overall curved surface may be accommodated. Thus, the present embodiments provide cooling solutions for devices and surfaces having irregular configurations, greatly expanding the options for using such devices in new environments.

In the context of LPFC heat sinks, the links between the pins shown in the present embodiments may have a curved shape, rather than a straight one. This curved shape will also have a lower modulus in compression or tension than a straight, centered link, allowing for much more lateral compression than straight links would have. The curved links in the LPFC heat sink of the present embodiments can also be formed at a higher density in areas where lower flow is desired, while still maintaining flexibility. This reduces or eliminates the need for separate flow blocking elements, as the heat sink itself can be constructed to provide specific flow pathways.

Figure 1:
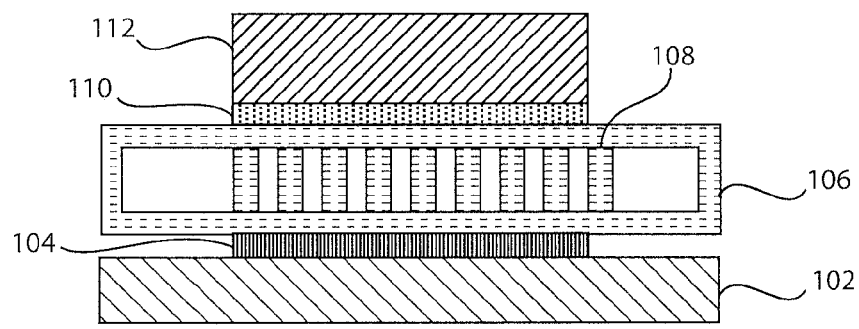
FIG. 1 is a cross-sectional view of a pin fin compliant heat sink in accordance with the present principles.

Referring now to the drawings in which like numerals represent the same or similar elements and initially to FIG. 1, an exemplary embodiment of a PFC cooling device is shown. A chip 104 is mounted on a substrate 102. For the present purposes, the chip 104 may be any appropriate device or circuit, and it is specifically contemplated that the chip 104 will be an integrated circuit package, mounted on a printed circuit board substrate 102. Although the chip 104 is shown as being flat for ease of illustration, it should be recognized that the top surface of the chip 104 may be uneven or curved. It is assumed for the present purposes that the chip 104 generates heat during operation, which necessitates some form of cooling, though the heat could also be generated within or behind the substrate 102.

A cooling device 106 is mounted on the chip 104, either directly or with some appropriate thermally conductive medium such as a thermal paste. The chip 104 has some irregularity in its surface, including one or more of local irregularities, such as a feature that extends from the plane of the surface. The chip 104 may also include global irregularities, such as an overall curve. According to the present principles, the cooling device 106 conforms to the surface of the chip 104 when pressure is applied. Heat passes to the cooling device 106 from the chip 104 and is dissipated by pins/fins 108. In the present example, the cooling device is an enclosure that channels air or some other coolant past pins 108, transporting the dissipated heat away from the chip 104. The coolant in question may be any appropriate fluid having suitable mechanical and thermal properties, including a high heat capacity and a low viscosity. In one specific embodiment, it is contemplated that water may be used as a coolant, but alternative coolants such as air, oil, or a liquid metal such as mercury, gallium or a gallium alloy such as with tin or indium.

A load 112 is applied to the cooling device 106. The load 112 is specifically contemplated as being a force provided by, e.g., a clamp, weight, or some other device that holds the cooling device 106 tightly onto the chip 104. The pressure generated by the load 112 provides good thermal contact between the cooling device 106 and the chip 104. A thermal paste or other thermally conductive compound (not shown) may be interposed between the cooling device 106 and the chip 104 to maximize thermal contact and heat flow between the two.

As noted above, the chip's surface may be uneven or curved. By conforming to the uneven surface of the chip 104, the cooling device 106 will have some corresponding deformation on its top surface as the pins 108 translate the deformation from the chip's surface. As such, an elastomer or spring array 110 is used between the load 112 and the cooling device 106 to transfer the force of the load 112 evenly across the cooling device 106. The elastomer 110 can be, for example, a rubber sheet which is disposed between the surface of load 112 and the top lid of the heat sink 106. The elastomer 110 may alternatively be formed as the top lid of the heat sink 106 itself, though care should be taken to ensure that coolant does not leak under deformation. Because the surfaces of the heat sink 106 may be corrugated, there may be openings in the heat sink 106 that the elastomer 110 should block. The elastomer layer 110 could also be replaced with an array of springs which provide a large number of distributed load points across the top of the PFC or LPFC heat sink 106.

Figure 2:
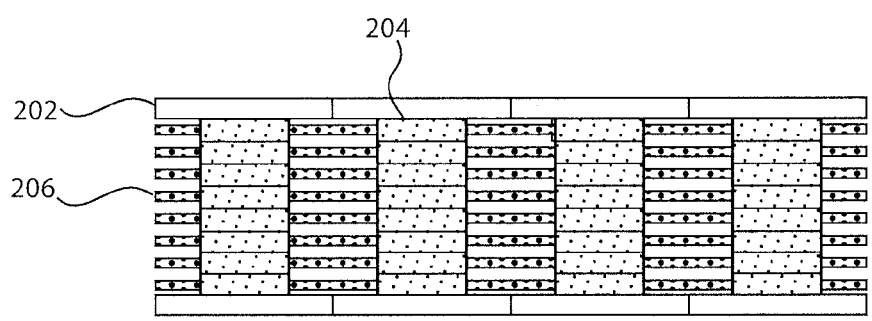
FIG. 2 is a cross-sectional view of a linked pin fin compliant heat sink in accordance with the present principles.

Referring now to FIG. 2, a detailed view of a portion of the cooling device 106 is shown in cross-section. This view shows an LPFC embodiment that has corrugated plates 202 connected by stacked pin slices 204. The individual slices 204 are laterally linked to one another by flexible connecting elements 206. The corrugated lids 202 allow relative vertical displacement of the stacks of pin slices 204 as well as lateral displacement. The connecting elements 206 are curved and flexible, allowing compression and extension between pin stacks 204 during lateral displacement. In the case of a PFC heat sink, the connecting elements 206 may be omitted. In any case, connecting elements 206 located in vertically neighboring layers should not be bonded to one another to maintain flexibility. As such, a gap is visible in FIG. 2 between the connecting elements 206 of adjacent levels. This gap allows coolant flow through the heat sink 106 as well.

It is specifically contemplated that the pin slices 204 may be formed from copper or a copper alloy, but it should be understood that any material with good heat conducting properties may be used instead. It is further contemplated that the connecting elements 206 may be formed from the same material as the pin slices 204 and that the slices 204 and the connecting elements 206 may be formed by etching sheets of material. The layers may also be formed using punch dies, by electroplating on a pattern, or by any other appropriate fabrication method. The individual layers may be simply arranged above one another, or the layers may have an adhesive or other type of bond between the slices 204. Bonding the slices 204 provides strength and improves heat conduction between adjacent slices 204, but may decrease flexibility in some cases.

Figure 3:
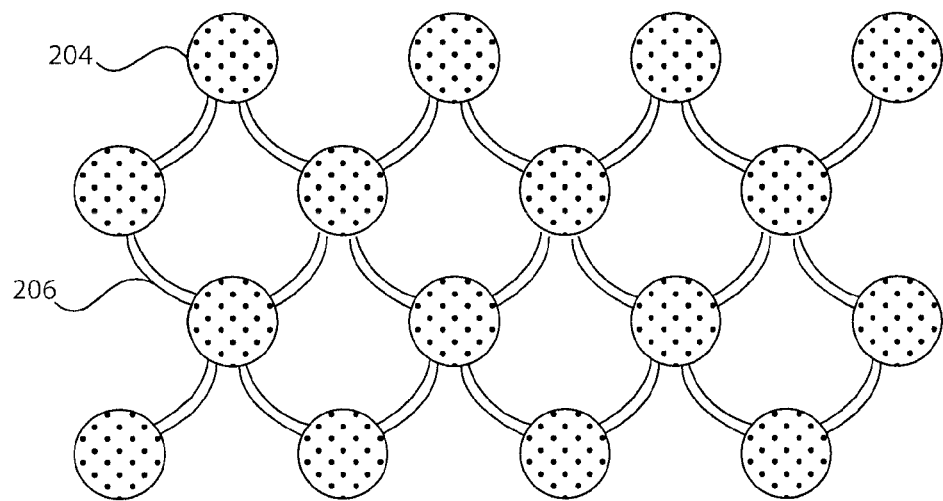
FIG. 3 is a top-down view of a layer of pin slices and links therebetween in accordance with the present principles.

Referring now to FIG. 3, a top-down view of a layer of pin slices 204 is shown. The layer is formed from pin slices 204, connected by connecting links 206. As shown, the connecting links 206 are curved to allow flexibility. The flexibility of the connections between laterally adjacent stacks of pin slices 204 may be increased by removing or thinning the links 206 using, for example, an etching process or a mechanical separation with an edged die. This allows precise control of the structure of the layers with respect to the connections between slices 204.

Although the links 206 are shown as being arranged in a regular pattern, the flow rate of coolant through the device 106 may also be controlled by selectively adding or removing links. Additionally, the links in in adjacent layers may be arranged to match or differ in the direction of their curve. For example, a stack of links that curve in the same direction will limit coolant flow more than if those links alternate in curve direction, allowing wider gaps between them. Links near the edge of the cooling device 106 that connect the same pair of slices 204 in adjacent layers serve to reduce flow in an inactive area of the chip 104. To allow flow to an area, the links may be arranged to curve in different directions, to connect to different slices 204, or to be entirely absent in an area of high flow—bearing in mind that each slice 204 may be connected to at least one neighboring slice 204 to maintain structural integrity. In this manner, the cooling device 106 may be designed to have a three-dimensional network of connections 206, the density of which along any given plane optimizes coolant flow around the chip, providing additional flow to areas that need additional cooling and reducing flow to areas that need less.

The use of curved links 206 provides additional options for customizing the rate of cooling. For example, consider two stacked layers. If two adjacent pin slices 204 in a given layer are connected by a link 206 that curves in a first direction, the corresponding pin slices 204 in the adjacent layer may be connected by a link 206 that curves in a second direction. This allows more coolant flow than two stacked links 206 that curve in the same direction. Additionally, although links 206 are shown using a single, uniform curvature, the shapes of the links 206 may be varied and may be non-uniform. For example, links in areas where high flexibility is needed may have multiple curves or may have curves that are more pronounced, allowing for additional lateral motion of the cooling device 106. Links 206 in areas where less flexibility is needed or desired may have shapes that are less flexible, lending additional strength to the cooling device 106. The links 206 are essentially springs, and the spring constant of each link 206 may be controlled as appropriate.

Figure 4:
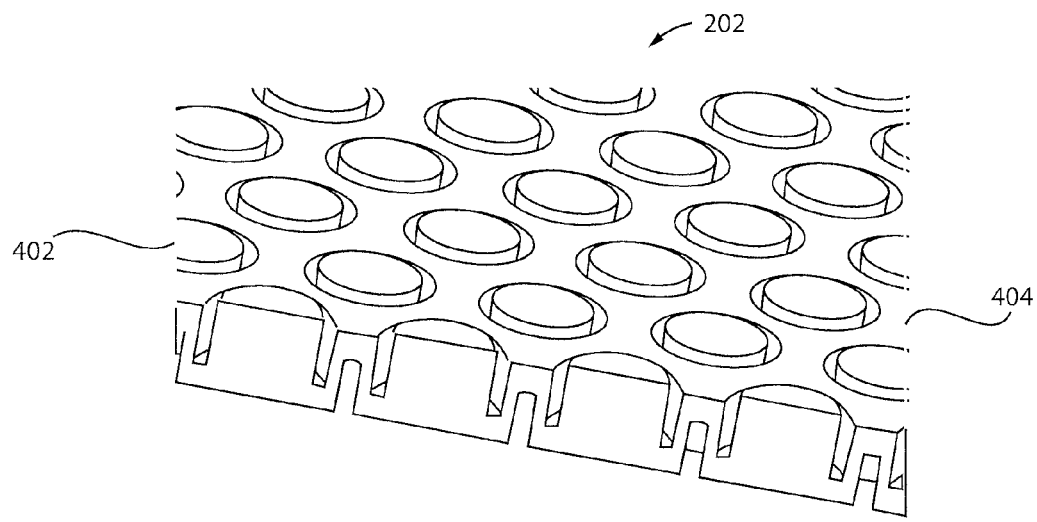
FIG. 4 is a three-dimensional view of the top of a corrugated plate in accordance with the present principles.

Referring now to FIG. 4, a three-dimensional view of a "top" of one embodiment for the lids 202 of the cooling device 106 is shown. The lid 202 includes a set of pin contacts 402 that align with the pin slices 204 of the adjacent layer. The pin contacts 402 are flexibly connected to a lid body 404. As shown, gaps between the pin contacts 402 and the lid body 404 provide flexibility that allows the lid contacts 402 to shift laterally with respect to one another, as well as transversely to the body 404.

Figure 5:
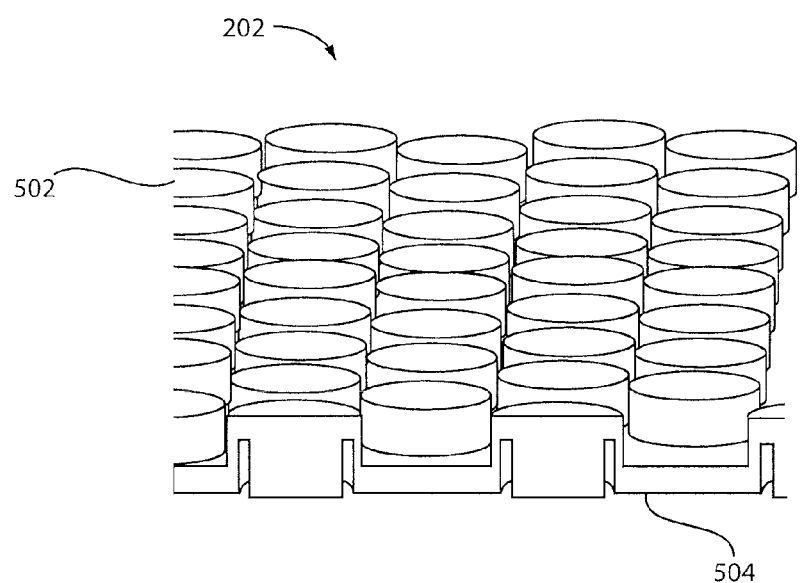
FIG. 5 is a three-dimensional view of the bottom of a corrugated plate in accordance with the present principles.

Referring now to FIG. 5, a three-dimensional view of a "bottom" of the lids 202 of the cooling device 106 is shown. From this angle, a set of cylindrical protrusions 502 are visible which are shown in cutaway to reveal a flexible ring 504 around the pin contacts 402. It is specifically contemplated that the lids will be made of copper, with the pictured structures created by an etching process, but it should be understood that the described embodiments may be formed using any appropriately conductive and flexible material and by any appropriate process, including, e.g., stamping and molding.

These embodiments of the lids 202 allow the individual pins to move vertically to conform to local deviations on the chip 104, but they also allow larger-scale deviations, such that the entire lid may flex to conform to a curved surface. In this manner, the PFC cooling device 106 may be used to provide cooling to a wide variety of surfaces that were not previously feasible. Although only two examples are shown herein, it is contemplated that those having ordinary skill in the art would be able to apply the present principles to create other shapes of corrugated lid in accordance with the present principles.

In one exemplary embodiment, the thickness of the lids is about 0.25 mm, with pin spacing in the range of 1.0 mm. These dimensions can be scaled up or down depending on the coolant type and the device to be cooled. These dimensions are provided for typical scenarios using semiconductor devices and liquid coolant, but for example a coolant having a lower viscosity (such as air) could have a smaller pin spacing without sacrificing coolant flow. It is similarly contemplated that pin diameters may be about 0.5 mm. Pin diameter for a given pin spacing trades off thermal effectiveness with coolant pressure drop, as larger pins have a higher surface area but block more of the coolant flow.

In an alternative embodiment of a corrugated lid, a complete or partially complete stack of layers 204, including the top and/or bottom lid 202, may be pressed together. This creates a 'u'-shaped connection between neighboring pins, rather than the flat connection created by a flat plate, as the once-flat membrane/plate is forced inward between the pins.

Figure 6:
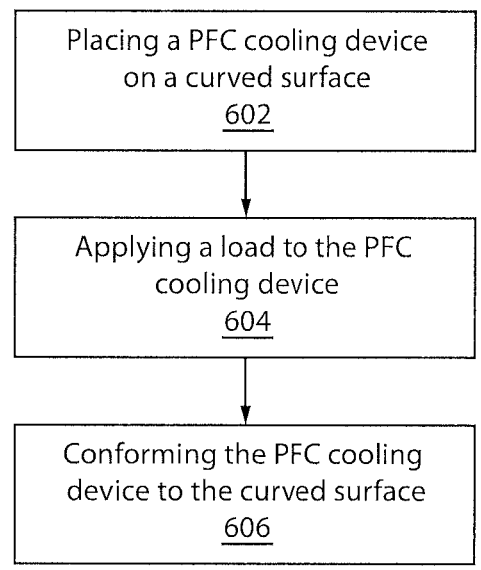
FIG. 6 is a block/flow diagram of a method of using a pin fin compliant heat sink in accordance with the present principles.

Referring now to FIG. 6, a method of applying a cooling device to a surface is shown. Block 602 places a PFC or LPFC cooling device 106 onto a curved surface. In the present embodiments, the surface may include chip 104 or any other curved surface that needs cooling. It should be recognized that the "curved surface" discussed herein need not have a smooth curve, but may have a stepped contour or any arbitrary shape. After the cooling device 106 is placed on the curved surface, block 604 applies a load 112 to the cooling device 106 that causes it to conform to the contours of the surface. To accomplish this, the load 112 itself should have some ability to conform to the contours as well, or should use an elastic or compressible layer 110 (e.g., an elastomer or distributed spring) to translate the flat force of the load 112 to the curved contour of the top surface of the cooling device 106. Block 606 then causes the cooling device 106 to conform to the curved surface, where the corrugated lids 202 and the curved links 206 allow both vertical displacement as well as lateral displacement.

Figure 7:
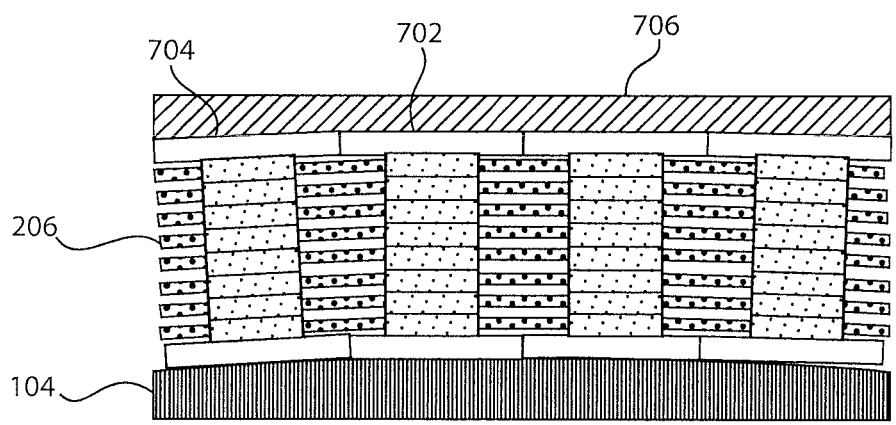
FIG. 7 is a cross-sectional view of a linked pin fin compliant heat sink on a globally curved surface in accordance with the present principles.

Referring now to FIG. 7, an embodiment is shown with a LPFC heatsink being applied to a curved surface 104. The corrugated plates shift vertically as well as horizontally with respect to one another, allowing them to accommodate the overall curve of the surface 104. In particular, the pins 702 in the center are relatively parallel with respect to one another, being over a flat portion of the surface 702, while the pins 704 at the ends are tilted to accommodate the curve. Also shown is the elastic layer 706, which conforms to the top surface of the top corrugated plate as a down pressure is applied. The elastic properties of the layer 706 help to distribute the downward force across the curved surface, which a rigid load would be unable to do. While less force will be applied to the outer pins 704 than to the inner pins 702, the corrugated configuration of the plates allows the entire heatsink to assume the shape of the surface 104 with less extreme pressures.

While the curved surface 104 is shown as having a relatively uniform shape, it should be understood that the surface 104 can have any shape. In particular, it should be recognized that the surface 104 can have local irregularities as well as global curvature, and that the pins will accommodate these irregularities primarily with vertical displacement.

Figure 8:
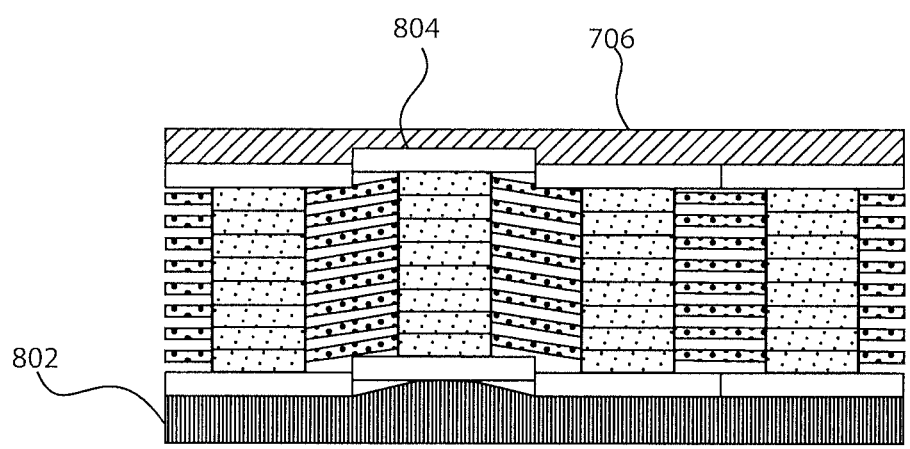
FIG. 8 is a cross-sectional view of a linked pin fin compliant heat sink in on an irregular surface accordance with the present principles.

Referring now to FIG. 8, an illustration of a curved surface 802 with a local irregularity is shown. In this instance, a single pin 804 displaces vertically to accommodate the irregularity in the surface 802. As above, the elastic layer 706 conforms to the top surface of the corrugated plate to provide downward pressure on the displaced pin 804 as well as on the remainder of the plate, thereby providing good thermal contact for the entire heat sink. While the figure shows a section moving in its entirety, it should be noted that both the top and bottom plates are essentially contiguous, forming a seal for the coolant flowing between them.

Thus, by providing the ability to deform vertically and horizontally, the present embodiments provide compliant heatsinks that can accommodate any surface geometry without applying a large force. This allows the present embodiments to be used on relatively delicate, irregularly-shaped surfaces, where a large amount of force might otherwise damage the device to be cooled.

The flowchart and block diagrams in the Figures illustrate the functionality, and operation of possible implementations of systems and methods according to various embodiments of the present invention. It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a pin fin compliant heat sink with enhanced flexibility and methods for using the same (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A heat sink, comprising:
a top and bottom plate, at least one of which comprises a plurality of pin contacts flexibly connected to one another, wherein the plurality of pin contacts have vertical and lateral flexibility with respect to one another, wherein at least one of the top and bottom plates is a corrugated plate that includes interlocking protrusions on opposite sides of the plate and wherein the pin contacts are flexibly connected to one another by the top and bottom plates; and
a plurality of substantially vertical pins, each formed from a plurality of pin slice layers and each comprising a plurality of pin slices arranged vertically between the top and bottom plates such that the plurality of pin slices form substantially vertical pins connecting the top and bottom plates.

2. The heat sink of claim 1, wherein the corrugated plate includes open space around each of said protrusions to allow flexibility.

3. The heat sink of claim 1, wherein the plurality of pin slices layers each further comprises a plurality of curved links between pin slices.

4. The heat sink of claim 3, wherein the curved links of adjacent pin slice layers are arranged vertically to block coolant to regions of lower coolant needs.

5. The heat sink of claim 3, wherein the curved links of respective pin slice layers are omitted to increase coolant to regions of higher coolant needs.

6. The heat sink of claim 1, further comprising a compressible layer disposed over the top plate, configured to distribute a load force to the top plate when the top plate is deformed.

7. The heat sink of claim 1, wherein the bottom plate is disposed on a non-flat surface and conforms to the shape of the non-flat surface under load and wherein the vertically arranged pin slice layers communicate the shape of the non-flat surface to the top plate, which deforms vertically and laterally to conform to the non-flat surface.

8. A linked pin fin compliant heat sink, comprising:
a top and bottom plate, each comprising a plurality of pin contacts, wherein at least one of the top and bottom plates is a corrugated plate that includes interlocking protrusions on opposite sides of the plate and wherein the pin contacts are flexibly connected to one another by the top and bottom plates;
a plurality of pin slice layers, each comprising a plurality of pin slices, arranged vertically between the top and bottom plates such that the plurality of pin slices form substantially vertical pins connecting the top and bottom plates; and
a plurality of curved links connecting laterally adjacent pin slices in at least a pin slice layer.

9. The linked pin fin compliant heat sink of claim 8, wherein the corrugated plate includes open space around each of said protrusions to allow flexibility.

10. The linked pin fin compliant heat sink of claim 8, wherein the curved links between vertically adjacent pin slice layers are arranged to align vertically to block coolant to regions of lower coolant needs.

11. The linked pin fin compliant heat sink of claim 8, wherein one or more curved links of at least a respective pin slice layer are omitted to increase coolant to regions of higher coolant needs.

12. The linked pin fin compliant heat sink of claim 8, wherein curved links between corresponding pin slices on at least two adjacent layers curve in different directions with respect to one another.

13. The linked pin fin compliant heat sink of claim 8, wherein the curved links have a thinner vertical cross-section than the pin slice layers.

14. The linked pin fin compliant heat sink of claim 8, wherein the plurality of curved links are arranged to create regions of higher coolant flow and regions of lower coolant flow, such that coolant through the heat sink follows a specified path.

15. A heat sink, comprising:
a top and bottom plate, at least one of which comprises a plurality of pin contacts flexibly connected to one another, wherein the plurality of pin contacts have vertical and lateral flexibility with respect to one another, wherein at least one of the top and bottom plates is a corrugated plate that includes interlocking protrusions on opposite sides of the plate and wherein the pin contacts are flexibly connected to one another by the top and bottom plates;
a plurality of substantially vertical pins connecting the top and bottom plates; and
a compressible layer disposed over the top plate, configured to distribute a load force to the top plate when the top plate is deformed.

16. The heat sink of claim 15, wherein the vertical pins comprise a plurality of pin slice layers, each comprising a plurality of pin slices, arranged vertically between the top and bottom plates such that the plurality of pin slices form substantially vertical pins connecting the top and bottom plates.

17. The heat sink of claim 16, wherein the bottom plate is disposed on a non-flat surface and conforms to the shape of the non-flat surface under load and wherein the vertically arranged pin slice layers communicate the shape of the non-flat surface to the top plate, which deforms vertically and laterally to conform to the non-flat surface.

18. The heat sink of claim 16, wherein the plurality of pin slices layers each further comprises a plurality of curved links between pin slices.

19. The heat sink of claim 18, wherein the curved links of adjacent pin slice layers are arranged vertically to block coolant to regions of lower coolant needs.

20. The heat sink of claim 18, wherein the curved links of respective pin slice layers are omitted to increase coolant to regions of higher coolant needs.

* * * * *